United States Patent
Varma et al.

(12) 
(10) Patent No.: US 6,481,903 B1
(45) Date of Patent: *Nov. 19, 2002

(54) OPTICAL FIBER SPLICE PROTECTOR AND METHOD FOR APPLYING SAME

(75) Inventors: Ramesh Varma, Berkeley Heights; Richard S. Riggs, Somerville, both of NJ (US)

(73) Assignee: TyCom (U.S.) Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,381
(22) Filed: Aug. 7, 1998
(51) Int. Cl.[7] ............................................. G02B 6/255
(52) U.S. Cl. ............................ 385/99; 385/95; 385/97; 385/98
(58) Field of Search .................................. 385/95–99

(56) References Cited

U.S. PATENT DOCUMENTS

| | | | |
|---|---|---|---|
| 4,544,234 A | * 10/1985 | DeVeau | 385/98 |
| 4,923,268 A | 5/1990 | Xu | 350/96.15 |
| 4,969,705 A | 11/1990 | Stoy et al. | |
| 5,076,657 A | 12/1991 | Toya et al. | 385/96 |
| 5,249,246 A | 9/1993 | Szanto | |
| 5,257,337 A | 10/1993 | Grigsby et al. | 385/99 |
| 5,309,536 A | 5/1994 | Suganuma et al. | 385/43 |
| 5,642,451 A | 6/1997 | Kennedy et al. | |
| 5,731,051 A | 3/1998 | Fahey et al. | 428/34.9 |

* cited by examiner

Primary Examiner—Darren Schuberg
Assistant Examiner—Fayaz Assaf

(57) ABSTRACT

An optical fiber splice protector protects a splice between a first optical fiber and a second optical fiber. The first optical fiber includes a first fiber coating and the second optical fiber includes a second fiber coating where the second fiber coating has a larger diameter than the first fiber coating. The splice protector includes a sleeve that is applied around the first fiber coating. The sleeve has a similar diameter to the diameter of the second fiber coating. A splint is applied around the splice of the first optical fiber and the second optical fiber and extends from the sleeve to the second fiber coating. Additionally, a method for applying a fiber optic splice protector is provided. The method includes the steps of positioning the splint around the splice, proof testing the splice, and heat curing the splint around the splice after proof testing of the splice.

18 Claims, 5 Drawing Sheets

OPTICAL FIBER SPLICE PROTECTOR AND METHOD FOR APPLYING SAME

BACKGROUND OF THE INVENTION

The present invention relates to a high reliability optical fiber splice protector and a method for applying the protector to the splice. More specifically, the invention provides for protecting a splice between a first optical fiber and a second optical fiber where the first optical fiber and the second optical fiber are contained in jackets or coatings of dissimilar diameters.

A currently known method for protecting a splice between optical fibers that are contained within jackets of dissimilar diameters utilizes a splint which is applied over the splice and which extends from the jacket of one fiber to the jacket of the other fiber. FIG. 1 illustrates a splice 100 between two fibers that are contained within jackets of different diameters. As illustrated, fiber 110 is spliced to fiber 120. Fiber 110 is contained in jacket 112, which has a larger outside diameter than jacket 122, which contains fiber 120. As is shown in FIG. 2, the currently known method for protecting the splice utilizes a splint 130 that extends from the larger diameter jacket 112 to the smaller diameter jacket 122. No accommodation is made when applying the splint for the difference in the diameters of jackets 112 and 122.

This method of protecting the splice presents drawbacks, especially if the spliced fibers are utilized in a high reliability fiber optic communication system where strength of the splice and the protector are of significant importance. Because of the difference in the diameters of the jackets, forces may not be equally applied across the splice and thus greater stresses may be applied to the splice. Additionally, handling of the spliced fiber is made more difficult. For example, if the spliced fiber is coiled, e.g., for storage purposes, a kink may develop in the coiled fiber resulting in damage to the splice and/or fiber. Therefore, whereas the above-described method for protecting a splice may be adequate for use in some types of fiber optic communications systems, e.g., a terrestrial-based system, it is not adequate for use in a high reliability system, such as a submarine, or undersea, fiber optic transmission system, where the reliability requirement is typically 25 years. Submarine systems are generally subjected to greater stresses than terrestrial systems during installation and are not easily accessible once installed.

An additional drawback with the known methodology is related to the method of applying the splice protector to the splice. Currently, when applying the splice protector, testing of the splice is conducted after the protective splint has been applied over the splice. The testing is directed to determining the loss characteristics of the splice after the splint has been applied and only indirectly tests the strength of the splice itself. Because the systems that the splice is employed in are not usually stressed to the extent that a high reliability system is stressed, the strength of the splice itself is not of prime concern. Therefore, the splice is only tested for light transmittance and strength after the splint is applied. However, this method of testing the splice, i.e., after the splint has been applied, does not test all of the characteristics of the splice that are of importance if the splice is to be utilized in a high reliability system, namely the strength of the splice itself before the splint is applied. Therefore, it would be desirable to provide for a method of applying a splice protector that tests characteristics of the splice that are of importance when the splice is used in a high reliability system.

As addressed above, the currently known method for protecting a splice between fibers contained in dissimilar jackets presents drawbacks if the splice is to be utilized in a high reliability system. Therefore, it would be desirable to provide for a highly reliable optical fiber splice protector and a method for applying the splice protector to the splice.

SUMMARY OF THE INVENTION

The drawbacks in the prior art are overcome by the present invention for a high reliability optical fiber splice protector and a method for applying the protector. In accordance with an embodiment of the present invention, an optical fiber splice protector for protecting a splice between a first optical fiber and a second optical fiber is provided. The first optical fiber includes a first fiber coating and the second optical fiber includes a second fiber coating where the second fiber coating has a larger diameter than the first fiber coating. The splice protector includes a sleeve that is applied around the first fiber coating. The sleeve has a similar diameter to the diameter of the second fiber coating. A splint is applied around the splice of the first optical fiber and the second optical fiber and extends from the sleeve to the second fiber coating.

Additionally, a method for applying a fiber optic splice protector to a spliced fiber is provided. The method includes the steps of positioning the splint around the splice, proof testing the splice, and heat curing the splint around the splice after proof testing of the splice.

In this manner, the present invention provides for a fiber optic splice protector for protecting a splice between fibers contained in dissimilar jackets and a method for applying a splice protector. The present invention has particular utility for use in high reliability systems, such as submarine fiber optic communication systems.

DETAILED DESCRIPTION

Figure 1:
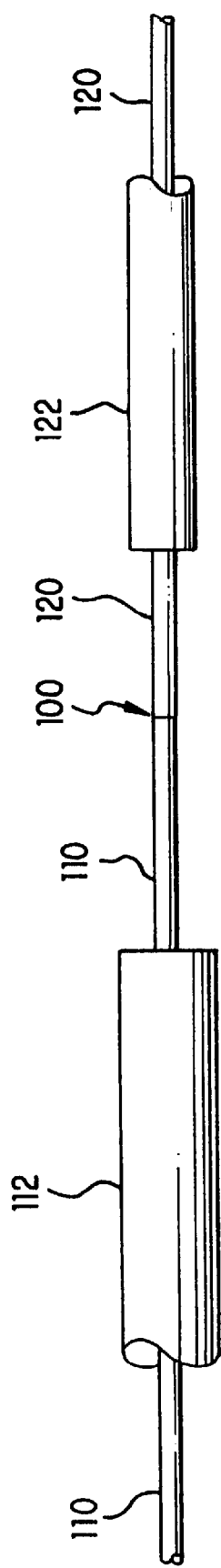
FIG. 1 illustrates a splice between optical fibers that are contained in jackets of dissimilar diameters.
Figure 2:
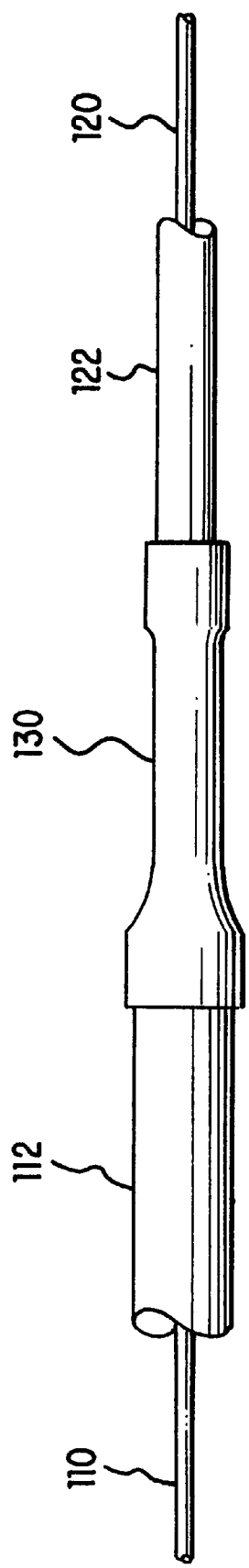
FIG. 2 illustrates a prior art method for protecting the splice of FIG. 1.
Figure 3:
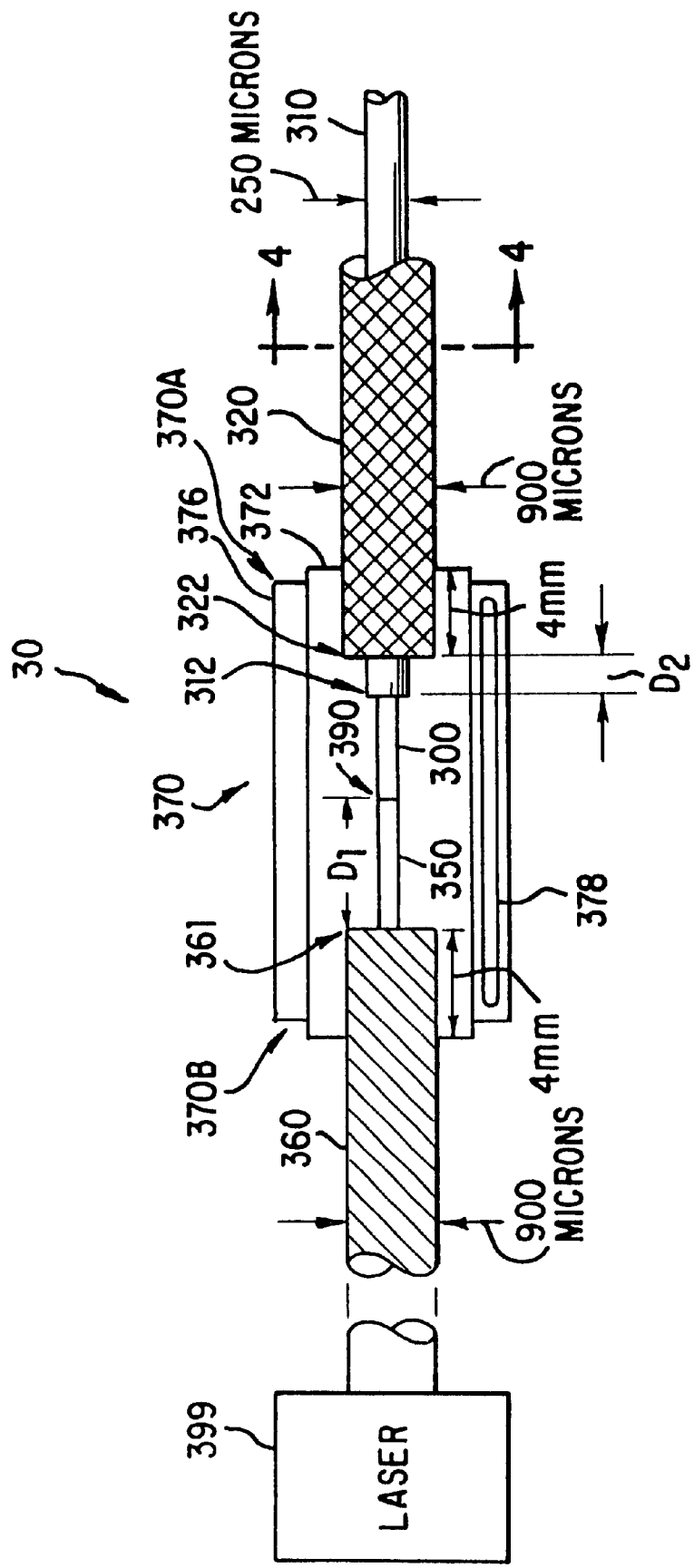
FIG. 3 illustrates a fiber optic splice protector in accordance with an embodiment of the present invention.

FIG. 3 illustrates one embodiment for the fiber optic splice protector 30 of the present invention. As will be further described, splice protector 30 includes sleeve 320 and splint 370. Support member 378 may also be utilized in the splice protector 30 of the present invention.

As can be seen, a first fiber 300 is joined to a second fiber 350 through splice 390, as is well-known in the art. Fiber 300 and fiber 350 can be either single-mode or multi-mode fibers and the present invention is not limited to any particular type of optical fiber.

First fiber 300 is contained in a fiber coating 310 that has an outside diameter of a first size, for example 250 microns, and second fiber 350 is contained in a fiber coating 360 that has an outside diameter of a second size, for example 900 microns.

Second fiber coating 360 can be comprised of two layers (not shown) such as an inner layer of CPC-6 acrylate having a first diameter of, for example, 250 microns or 500 microns, and an outer layer of Nylon-12 having a second diameter such as 900 microns. Regardless of how the fiber coatings are formed, the outer diameter of second fiber coating 360 is significantly larger and stiffer than the outer diameter of first fiber coating 310. As an example of an application where joining of these types of fibers could be required is in a repeater in a submarine fiber optic communications system. Fiber 350 could be a Corning SMF-28 single mode fiber that extends from a laser 399. Fiber 300 could be a Lucent 100C fiber that is utilized in an optical pump unit assembly.

Figure 4:
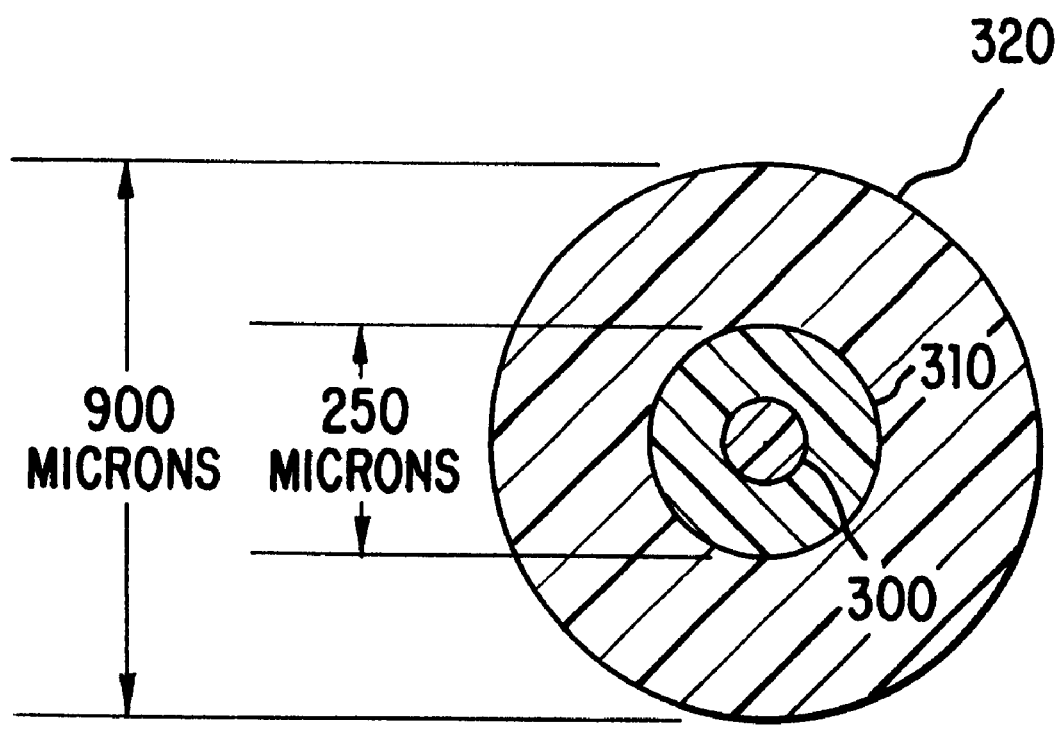
FIG. 4 is cross-sectional view of the sleeve as applied to the first fiber coating taken along line 4—4 of FIG. 3.

Both the first fiber coating 310 and the second fiber coating 360 are stripped back from the spliced end of their respective fibers a distance $D_1$. A representative length for distance $D_1$ is 5 millimeters (mm). Sleeve 320 is a hollow tube into which fiber coating 310, and thus fiber 300, is inserted. Sleeve 320 has an outside diameter of approximately 900–1000 microns such that when it is placed around fiber coating 310, the outside diameter of the combined protective coatings around fiber 300, i.e., coating 310 and sleeve 320, is approximately the same diameter as protective coating 360, which encloses fiber 350. Sleeve 320 can be any length, however, a minimum length of approximately 2 inches is preferred. Sleeve 320 can be manufactured from a variety of materials, one of which is hytrel. FIG. 4 is a cross-sectional view of sleeve 320 on first fiber 300 and fiber coating 310.

Sleeve 320 is aligned on fiber coating 310 such that end 322 of sleeve 320 is positioned a distance $D_2$ from end 312 of first fiber coating 310. Distance $D_2$ is a minimum of 2 millimeters and a maximum of 5 millimeters. It is important that sleeve 320 be positioned as described above with respect to first fiber coating 310. If end 322 of sleeve 320 was positioned beyond end 312 of first fiber coating 310 such that it was positioned closer to splice 390 than was end 312, it is possible that air pockets could be formed within sleeve 320 in the area between end 322 of sleeve 320 and end 312 of coating 310 when splint 370 is applied over splice 390, as will be explained. Any formation of air pockets within splint 370 could weaken the strength of the splice protector. By positioning sleeve 320 with respect to first fiber coating 310 as described above, a gradually-stepped diameter from fiber 300 to sleeve 320 is provided which serves to assist in creating a strong bond between splint 370 and the fiber coatings that enclose fiber 300.

Splint 370, after heat curing of the splint, as will be described, encloses splice 390 and extends from sleeve 320 at a first end 370A to second fiber coating 360 at a second end 370B. It should be noted that splint 370 and sleeve 320 are initially positioned on second fiber coating 360 and first fiber coating 310, respectively, prior to the splicing of first fiber 300 to second fiber 350. The final alignment of splint 370 and sleeve 320 with respect to the spliced fibers is as described in this specification.

Splint 370 is comprised of an inner tube 372 and may include an outer tube 376 and may have a support member 378. Inner tube 372 may be comprised of any of a wide variety of polymers, an example of which is ethylenevinylacetate. Outer tube 376 may be formed of any heat-shrinkable polymer, e.g., polyethylene. Outer tube 376 and, if needed, support member 378 are used to provide further support and protection to splice 390. Support member 378, which may be a metal rod, is inserted within outer tube 376 and is thus positioned between inner tube 372 and outer tube 376. Support member 378 should be of sufficient length such that it extends from sleeve 320 to second fiber coating 360 and can be manufactured from any of a variety of materials, including steel. In selecting a material for the support member, consideration should be given to its ability to resist the bending forces that may be applied to it when the splice is inserted into a particular application.

In applying splint 370 around splice 390, the splint is heat cured around the splice. In the heat curing process, inner tube 372 is melted and outer tube 376 is heat shrunk. Thus, support member 378 is securely positioned between the inner tube 372 and the outer tube 376. Heat is applied at the splint center first and then gradually applied towards the ends of the splint in order to prevent air bubbles from forming within the splint during heat curing. After curing, splint 370 extends approximately 4 mm along sleeve 320 and second fiber coating 360 from the respective ends 322 and 361 of the sleeve and second fiber coating A splint that may be utilized with the present invention is one that is available from Amherst International with a product number of 135-0201.

In the process of applying splint 370 around the spliced fiber, the strength of splice 390 is tested before heat curing of the splint. It is important to test the strength of the splice before heat curing of the splint because when the splint-protected splice is utilized in a high reliability system, the strength of the splice itself, and not just the strength of the splint-protected splice, is important. Therefore, the method of the present invention proof tests the strength of the splice before heat curing of the splint around the splice.

Figure 5:
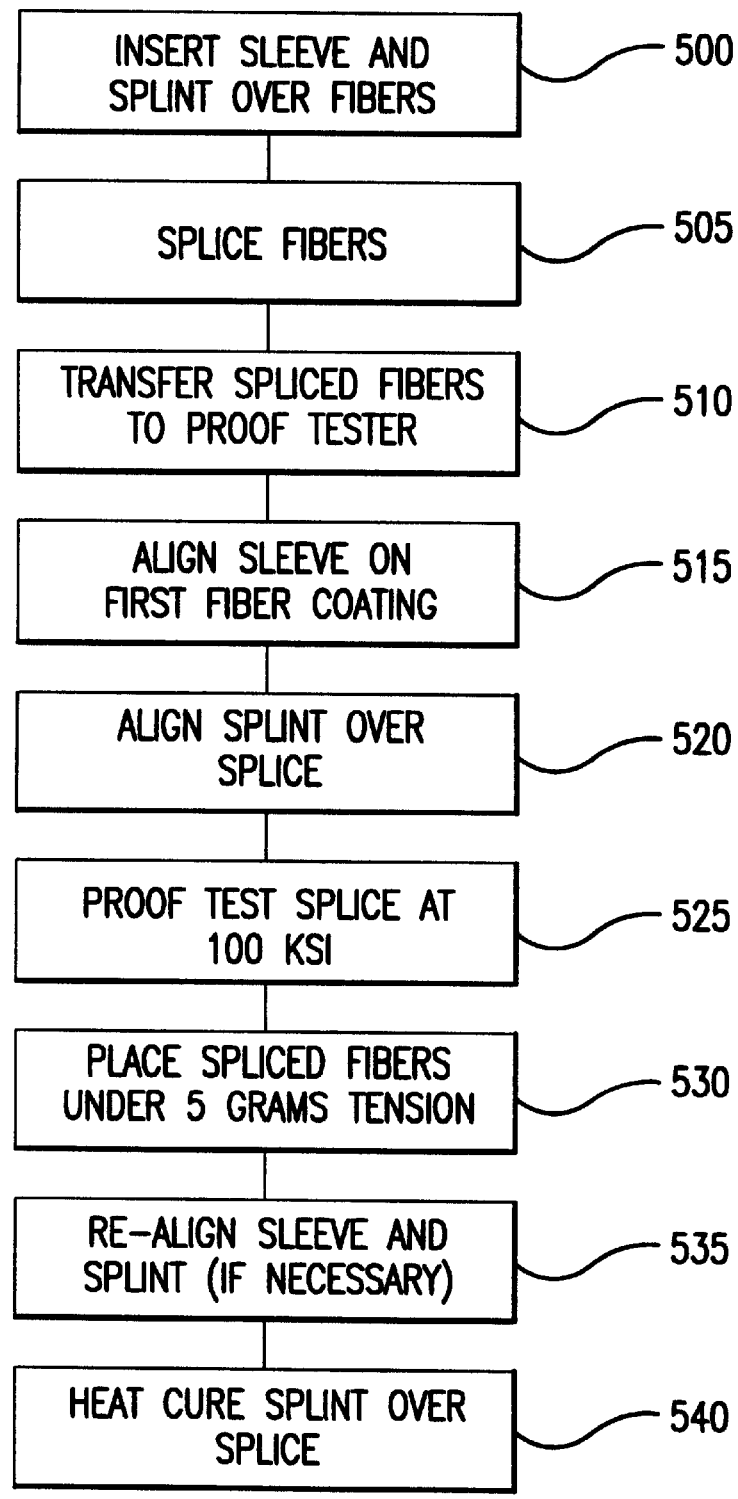
FIG. 5 provides a process flow chart for the method steps in practicing an embodiment of the present invention.

FIG. 5 illustrates the method steps for practicing an embodiment of the present invention. In step 500, the sleeve and splint are placed on the fibers that are to be spliced. In step 505, first fiber 300 is spliced to second fiber 350 by utilizing methods that are well-known in the art. After splicing the fibers, the spliced fibers are transferred to the proof tester, step 510. In step 515, the sleeve 320 is aligned on first fiber coating 310, as previously described, and in step 520 the splint 370 is aligned over splice 390, where it extends from sleeve 320 to second fiber coating 360. In step 525, the splice 390 is proof tested at 100 kilograms per square inch (ksi). A proof tester such as those made by Vytran may be utilized. By proof testing the splice before the splint is heat cured over the splice, the strength of the splice itself is directly tested. Additionally, it is important that the splint and sleeve be aligned as described above prior to proof testing the splice. This eliminates the possibility that damage to the splice could occur after the splice is proof tested due to forces applied to the splice as a result of large scale movements of the splint and/or sleeve.

After the splice is proof tested, the spliced fiber is placed under a minimum tension of 5 grams for the duration of the heat curing process, step 530. The spliced fiber is placed under tension to remove any slack that may develop in the fiber after the 100 ksi proof test is completed. If the splint is cured over the spliced fiber while there is slack in the fiber, the slack could cause fiber bending and/or buckling which could detrimentally affect the light transmission properties of the fiber and the strength of the fiber. Therefore, applying a minimum tension of 5 ksi to the fiber during the splint curing process eliminates this potential problem. Whereas it is beneficial to place the spliced fiber under tension during splint curing, it is not required when practicing the present invention.

In step 535, the splint and sleeve can be realigned, if necessary. This step implies minor adjustments to the positioning of the splint and sleeve after the proof testing and tensioning steps are performed. As discussed previously, the splint and sleeve have previously been aligned and these minor adjustments are only meant to refine their positions. In step 540, the splint is heat cured over the splice, as previously described.

The disclosed embodiments are illustrative of the various ways in which the present invention may be practiced. Other embodiments can be implemented by those skilled in the art without departing from the spirit and scope of the present invention. For example, in the disclosed embodiments, the splice is proof tested at 100 ksi and the spliced fiber is placed under a minimum tension of 5 grams during the curing process, however, the present invention is not limited to these quantitative values for the forces applied in these steps. The proof test and tensioning steps can be accomplished by utilizing any value for the applied forces, depending upon the requirements of the system into which the splice will be inserted.

What is claimed is:

1. A method for protecting a splice between a first optical fiber and a second optical fiber, said first optical fiber having a first coating and the second optical fiber having a second fiber coating, said second fiber coating having a larger diameter than the first fiber coating, said method comprising the steps of:

applying a hollow sleeve around the first fiber coating;
   applying a splint around the splice, and splint comprising:
      and inner tube positioned at least around said hollow tube sleeve, said second fiber coating, and said splice, said inner tube defining a space between said splice, said hollow tube and said second fiber coating;
   applying an outer tube around said inner tube; and
   heating said splint such that said inner tube collapses within said space, and said outer tubes shrinks around said inner tube, said hollow tube, and said splice.

2. The method of claim 1 wherein an end of said sleeve is positioned a distance from an end of the first fiber coating.

3. The method of claim 1 further comprising the step of inserting a support member within said splint.

4. The method of claim 3 wherein said support member is a metal rod.

5. The method of claim 1 wherein said sleeve has a diameter of approximately 900 microns.

6. The method of claim 2 wherein the end of the first fiber coating is positioned a distance of approximately 5 millimeters from a spliced end of the first fiber and wherein the end of said sleeve is positioned between 2 millimeters and 5 millimeters from the end of the first fiber coating in a direction away from the spliced end of the first fiber.

7. The method of claim 1 wherein said step of heating said splint comprises the steps of:

first applying heat at the center of said splint; and
   gradually applying heat from the center of said splint to the ends of said splint.

8. The method of claim 1 further comprising the step of proof testing the spliced first fiber and second fiber prior to the step of heating said splint.

9. The method of claim 8, further comprising the step of placing the spliced first fiber and second fiber under a tension after the step of proof testing the spliced fiber and prior to the step of heating said splint.

10. The method of claim 9 wherein said tension is a minimum of 5 ksi.

11. An optical fiber splice protector for protecting a splice between a first optical fiber and a second optical fiber wherein the first optical fiber includes a first fiber coating and the second optical fiber includes a second fiber coating and wherein the second fiber coating has a larger diameter than the first fiber coating comprising:

a hollow tube sleeve disposed around the first fiber coating;
   a splint comprising
      an inner tube disposed around the splice of the first optical fiber and the second optical fiber and said hollow tube,
      an outer tube disposed around said inner tube, such that upon heat curing said inner tube collapses and said outer tube shrinks around said inner tube, said hollow tube and said splice.

12. The splice protector of claim 11 wherein an end of said sleeve is positioned a distance from an end of the first fiber coating.

13. The splice protector of claim 12 wherein said end of said sleeve is positioned between 2 millimeters and 5 millimeters from the end of the first fiber coating.

14. The splice protector of claim 11 further comprising a support member, said support member positioned within said splint.

15. The splice protector of claim 14 wherein said support member is a metal rod.

16. The splice protector of claim 12 wherein said sleeve has a diameter of approximately 900 microns.

17. A method for protecting a splice between a first optical fiber and a second optical fiber, said first optical fiber having a first coating and the second optical fiber having a second fiber coating, said method comprising the steps of:

applying a hollow tube sleeve around the first fiber coating;
   applying a splint around the splice, said splint comprising:
      an inner tube positioned at least around said hollow tube sleeve, said second fiber coating, and said splice, said inner tube defining a space between said hollow tube and said second fiber coating;
   applying an outer tube around said inner tube; and
      heating said splint such that said inner tube collapses within said space, and said outer tube shrinks around said inner tube, said hollow tube, and said splice.

18. An optical splice protector for protecting a splice between a first optical fiber and a second optical fiber wherein the first optical fiber includes a first fiber coating and the second optical fiber includes a second fiber coating comprising:

a hollow tube sleeve disposed around the first fiber coating, said sleeve having an outer diameter of approximately the same size as the second fiber coating;
   a splint comprising
      an inner tube disposed around the splice of the first optical fiber and the second optical fiber and said hollow tube,
      an outer tube disposed around said inner tube such that upon heat curing said splice said inner tube collapses and said outer tube shrinks around said inner tube, said hollow tube and said splice.

* * * * *